United States Patent [19]

Inserra et al.

[11] Patent Number: 5,188,514

[45] Date of Patent: Feb. 23, 1993

[54] PROCESS FOR MANUFACTURING AN IMPELLER BY ELECTRICAL DISCHARGE MACHINING AND ARTICLES SO OBTAINED

[75] Inventors: Dario Inserra, Collegno; Marco Marzio, Torino; Paolo Pellizzari, Settimo Torinese, all of Italy

[73] Assignee: Varian Associates, Inc., Palo Alto, Calif.

[21] Appl. No.: 608,141

[22] Filed: Nov. 1, 1990

[30] Foreign Application Priority Data

Nov. 3, 1989 [IT] Italy ................ 67938 A/89

[51] Int. Cl.$^5$ .................... F01D 5/14; B23H 7/30; B23P 15/02
[52] U.S. Cl. .................... 416/223 A; 415/90; 219/69.2; 29/23.51; 29/889.23
[58] Field of Search .............. 416/223 A; 415/90; 219/69.15, 69.17, 69.2; 29/23.51, 889, 889.23

[56] References Cited

U.S. PATENT DOCUMENTS

| | | | |
|---|---|---|---|
| 2,633,776 | 4/1953 | Schenk | 29/889.23 |
| 3,288,699 | 11/1966 | Trager et al. | 219/69.17 |
| 3,748,055 | 7/1973 | Becker | 415/90 |
| 3,826,588 | 7/1974 | Frank | 415/90 |
| 5,033,936 | 7/1991 | Shinojima | 415/90 |

FOREIGN PATENT DOCUMENTS

| | | |
|---|---|---|
| 2717366 | 10/1978 | Fed. Rep. of Germany . |
| 2570970 | 4/1986 | France . |
| 965689 | 10/1982 | U.S.S.R. ............. 219/69.15 |
| 2171942 | 9/1986 | United Kingdom . |

Primary Examiner—Edward K. Look
Assistant Examiner—James A. Larson
Attorney, Agent, or Firm—Edward H. Berkowitz

[57] ABSTRACT

A process for manufacturing impellers of turbine pumps provides for subjecting disks corresponding to the impeller to be obtained to electrical discharge machining, using tools in form of plates provided with radial slits extending along at least an arc of circumference and opening into hollow areas. A combined motion of rotation and translation is imparted to the disks, thus generating twisted blades having a profile with defined geometric characteristics. A one-piece rotor can be manufactured employing open tools with slits formed along a semicircumference, and two passages in succession of the workpiece through the tools, moving the workpiece with a combined motion of rotation and translation. An advantageous application of the articles manufactured by this process is for rotors of turbomolecular pumps, since the compression ratio and the pumping speed are optimized and a considerable structural sturdiness of the article is obtained.

8 Claims, 3 Drawing Sheets

PROCESS FOR MANUFACTURING AN IMPELLER BY ELECTRICAL DISCHARGE MACHINING AND ARTICLES SO OBTAINED

BACKGROUND OF THE INVENTION

The present invention relates to a process for manufacturing, by means of electrical discharge machining (EDM) techniques, an impeller or a rotor having one or more impellers, in a turbine pump, particularly a turbomolecular pump, as well as to the impeller or the rotor obtained through such process.

A rotor in a turbomolecular pump is made up by a series of impellers that are keyed to a rotating shaft. Each impeller comprises a disk equipped with an array of radial peripheral blades which rotate, in use, at a speed of up to several tens of thousands rpm. The severe conditions of use and the ever increasing performance demands for turbomolecular pumps as to the compression and the pumping speed, require that the structure of each single impeller and of the rotor as a whole, be sturdy and balanced, and that the shape of the impeller blades is such as to optimize the pump performance.

The known processes for manufacturing impeller blades of turbomolecular pumps require the separate manufacture of the impellers and then their keying to the rotor shaft.

According to British Patent application No. 2 171 942, each impeller is built by milling the blades thereof by means of an apparatus that allows for the simultaneous machining of several disks. Nevertheless such machining requires several steps and is such as to impose limitations to the article characteristics: for example the gap between the blades cannot be smaller than certain values determined by the cutting methods employed. Moreover, the problems relating to keying the impellers to the shaft remain unsolved.

Another known approach is that of forming the single blades of the impeller by means of the electro-discharge machining technique. The use of this technique improves some characteristics of the article, e.g., reducing the gap between the blades when compared with that of a milling process, but nevertheless the manufacture process is still a long and costly one since the blades are built one by one and the single impellers have to be keyed to the rotor shaft. An example of this manufacture technique, which is not applied to rotors for turbomolecular pumps, is described in French Patent application No. 2 670 970.

DE-A-27 17 366 discloses an impeller with inclined blades for a turbomolecular pump, wherein the blade width, their thickness and their number are related by the following relationship:

$$(a/\tan \alpha) + (d/\sin \alpha) = 2\pi r/z$$

where $\alpha$ is the angle between the tangent to the radius r of each blade and the rotor plane. This document does not describe the process for manufacturing the impeller, nor does its disclose an impeller which is integral with the shaft.

An object of the present invention is that of overcoming or reducing the drawbacks of the known processes for manufacturing rotors of turbomolecular pumps, by providing a process that is both quick and adapted to produce an impeller or a rotor having high operating characteristics.

SUMMARY OF THE INVENTION

The above objects and advantages of the invention that will become evident from the following description are achieved by a process for manufacturing an impeller or a rotor having one or more blades for a turbine pump, comprising the steps of preparing a workpiece provided with at least one disk corresponding to the impeller to be realized, placing said workpiece within an apparatus for electrical discharge machining in such a manner as to act as an electrode thereof, passing said disk through a tool acting as the other electrode with a combined motion of rotation and translation, said tool comprising at least one plate in which radial slits are formed along at least an arc of circumference, said slits opening into a hollow area defined within said plate, so that an impeller blade is produced for each of said slits in said tool as a result of the combined motion of rotation and translation of said disk through said tool.

Another object of the invention resides in a process for obtaining a whole impeller by means of a single operation of electrical discharge machining, this process being characterized by the use of a tool provided with radial slits along a complete circular crown that is hollow at its center.

An additional object of the invention resides in a process for directly obtaining a rotor having one or more impellers from one or more disks already fastened to the rotor shaft, the process being characterized in that said disks are passed through one or more tools provided with radial slits as already explained.

An advantageous embodiment of this latter proces is obtained when the shaft and the disks form a one-piece semifinished product, so that the step of keying the impellers to the shaft is eliminated.

Some preferred embodiments of the invention, for illustrative and non-limiting purposes, will now be described with reference to the attached drawings.

DESCRIPTION OF PREFERRED EMBODIMENTS

Figure 1:
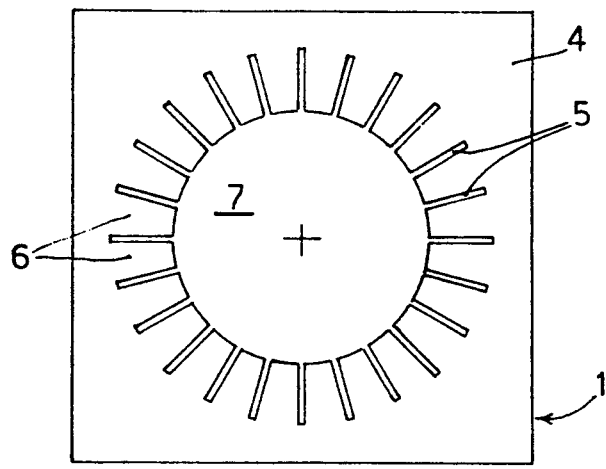
FIG. 1 is a plan view of a tool employed in the process according to the invention.
Figure 2:
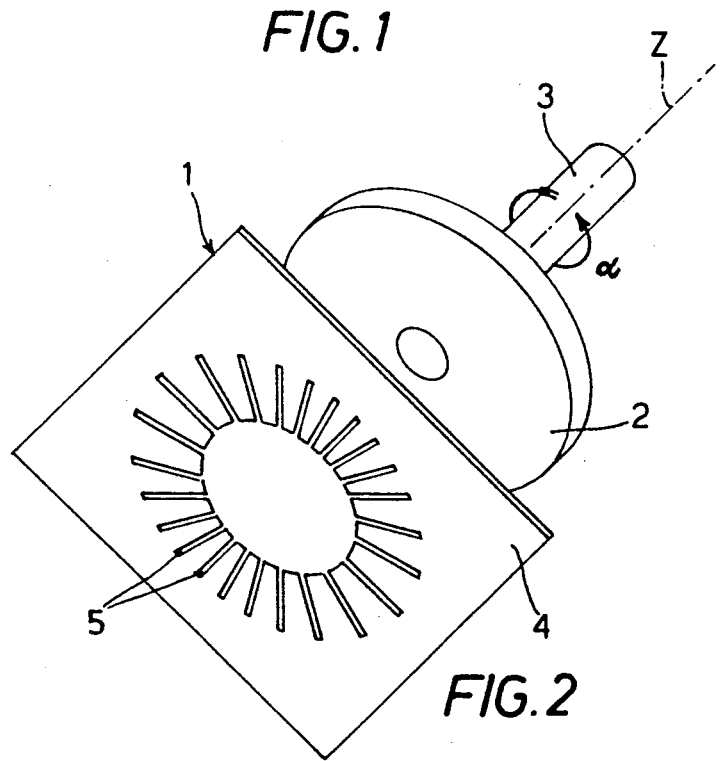
FIG. 2 is a schematic perspective view of a first embodiment of the apparatus, including the workpiece, for performing the process according to the invention.

Referring to FIGS. 1 and 2, a process for realizing a rotor impeller for a turbomolecular pump through electrical discharge machining is schematically illustrated, the tool being indicated at 1 and the workpiece at 2. Both these members are placed in an electrical discharge machine that has not been shown since it is known per se, the tool constituting one electrode and the workpiece the other one. The tool is made up by a plate 4 in which a series of equally spaced slits 5 radially extending along a circular crown, and opening towards the center into a through hole 7 in the plate. The workpiece 2 is made up by a metal disk having a size corresponding to that of the desired impeller and is either keyed to a shaft 3 or integrally formed with the shaft itself. The disk radius is equal to or smaller than the sum of the radius of the hole 7 and the length of the slit 5. The shaft 3 is mounted on a workhead that can be translated along the three cartesian axes and is further rotatable about the Z axis, under numerical control. As an alternative, the workpiece can be kept still and the tool 1 moved, in any case obtaining a relative combined motion of rotation and translation between the workpiece and the tool.

Figure 3:
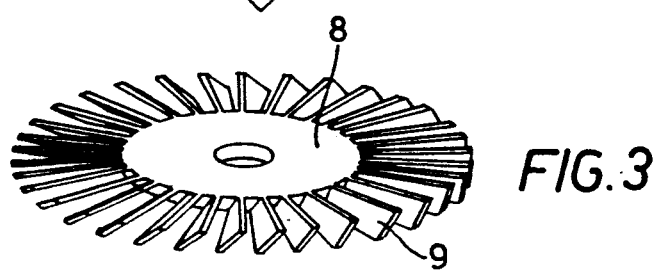
FIG. 3 is a perspective view of an impeller obtained through the process according to the invention.

By combining the movement of the workpiece along the Z axis with a rotation thereof by an angle $\alpha$ about such axis, a helical motion is obtained that carries the workpiece through the tool 1. In correspondence of the slits 5 the disk 2 is not fretted whereas the disk portions facing the areas 6 defined between two adjacent slits are taken away through the electrical discharge machining. Each slit 5 therefore produces an impeller blade. The so obtained impeller is schematically shown in FIG. 3. In correspondence of the central hole 7 in the plate 4, the disk material is not taken away so that a disk 8 is formed from which the blades 9 radially extend outwardly. Due to the rotation and translation advancing of the workpiece 2 through the tool 1, the blades 9 are formed twisted. That is the angle they form with respect to the disk 8 from which they originate progressively varies when proceeding radially outward, as will be discussed later with reference to FIGS. 8 to 13. Through such process it is possible to obtain blades having a reduced thickness when compared to those of the known manufacturing processes.

Figure 4:
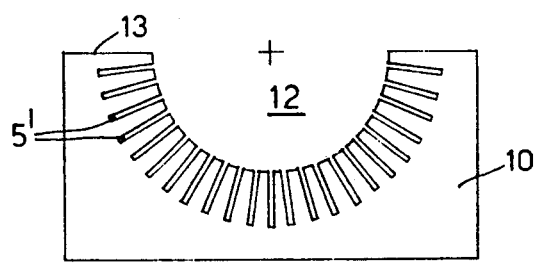
FIG. 4 is a plan view of another embodiment of the tool employed in the process according to the invention.

FIG. 4 shows a tool formed by a plate 10 in which radial slits 5' have been cut along a semicircumference, around a semicircular recess 12 formed in a side 13 of plate 1. This way the tool is "open" and is adapted for carrying out the process in a situation in which a plurality of disks 2 are already keyed to the shaft, or in the equivalent situation, which is preferred, wherein the shaft 3 and the disks 2 are integrally formed as a one-piece (monolithic) semifinished product, obtained, e.g., by turning or milling a metal cylinder.

Figure 5:
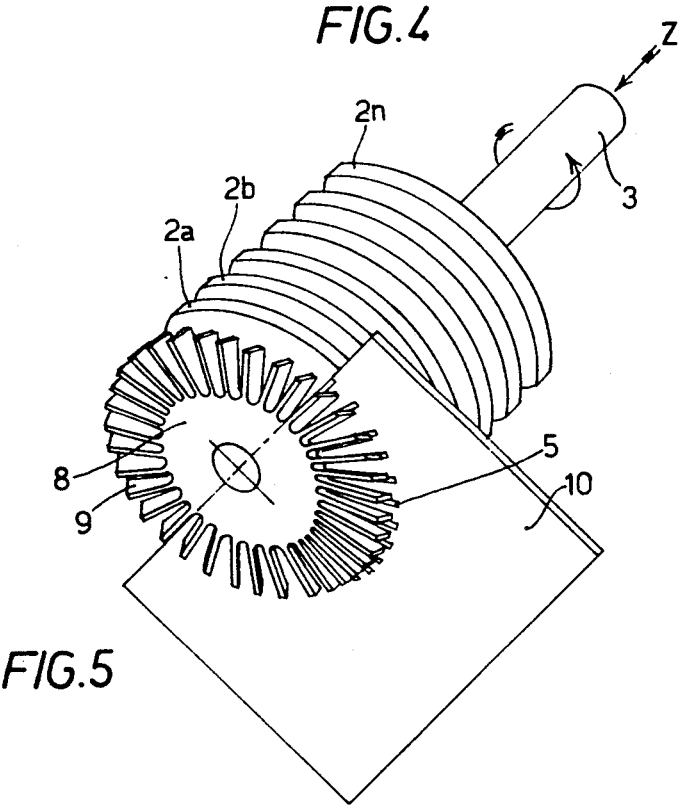
FIG. 5 is a schematic perspective view of a second embodiment of the apparatus, including the workpiece, for performing the process according to the invention.
Figures 6, 7:
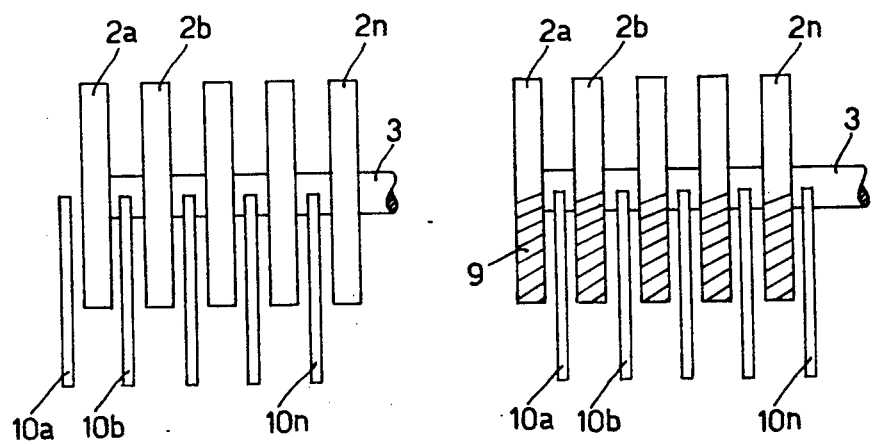
FIGS. 6 and 7 are schematic side views of two arrangements of tool and workpiece relating to the embodiment of FIG. 5.

With reference to FIGS. 5, 6 and 7, the workpiece is constituted by a shaft 3 comprising a series of disks 2a, 2b, . . . 2n, fastened to a workhead of the electrical discharge machine. The tool comprises an array of plates 10a, 10b, . . . 10n formed like the plate 10 of FIG. 4. By translating the workpiece along an axis orthogonal to the axis Z, the disks 2a, . . . 2n are inserted through the plates 10a, . . . 10n as shown in FIG. 6. FIG. 5 shows only one of such plates for an easier illustration. By imparting a combined motion of rotation and translation to the workpiece, each disk 2 passes through the corresponding plate 10 so that half of the impeller blades are formed on each disk, that is all the blades forseen on a disk semicircumference. The situation is shown in FIG. 7 which illustrates the so formed blades 9. The workpiece is then rotated either by $(180-\alpha)°$ in the same direction of rotation as angle $\alpha$, or in the opposite direction by $(180+\alpha)°$, and is subjected to another rotation and translation passage through the tools, by again moving the workpiece along the Z axis, but in opposite direction, thus obtaining an impeller complete with all the blades. It is evident that the above manufacture process allows for building a complete rotor of a turbine pump by means of an electrical discharge machining carried out in two steps only, by employing the "open" tools shown in FIGS. 4 to 7. In a completely equivalent manner it is possible to build the complete rotor through a single working step employing "closed" tools of the kind shown in FIGS. 1 and 2. In such case these latter can be split into two parts after the working is finished, in order to extract the finished workpiece that remains with its shaft 3 caught in the holes 7 of the plate 4. Using this process it is possible to obtain rotor shaving reduced gaps between an impeller and the adjacent one and, above all, one-piece rotors, thus overcoming the problems for keying the impellers to the shaft.

Figure 8:
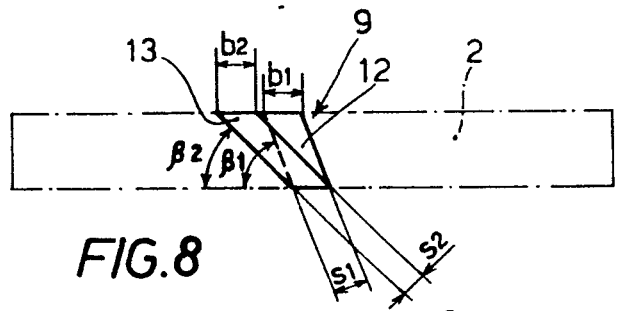
FIGS. 8 and 9 are a side and plan views, respectively, of a first type of impeller blade obtained through the process according to the invention.
Figure 9:
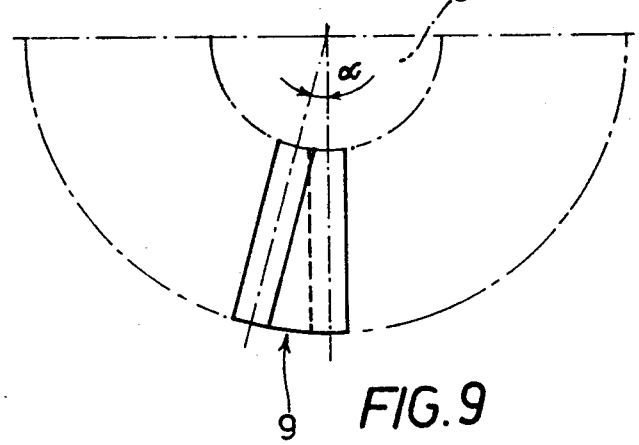

FIGS. 8 and 9 are a side view and a plan view, respectively, of a blade 9 obtained through the process of the present invention. In FIG. 8, the numeral reference 9 indicates the profile of the radially inner part of blade 9, tilted at an angle $\beta_1$ with respect to the horizontal, whereas reference 13 indicates the profile the blade assumes in its peripheral portion, which is tilted at an angle $\beta_2$ with respect to the horizontal. The twist of the blade is due to the variation of this profile along the radius.

The above structural feature of the blade, obtained as a result of the combination of the rotation and translation motions of the workpiece passing through the tool, imparts advantageous properties to the impeller, particularly of rotors for turbomolecular pump, since it optimizes the compression ratio and the pumping speed.

Figure 10:
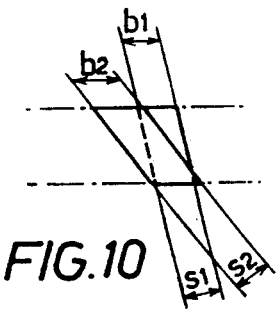
FIGS. 10 and 11 are a side and plan views, respectively, of a second type of impeller blade obtained through the process according to the invention.
Figure 11:
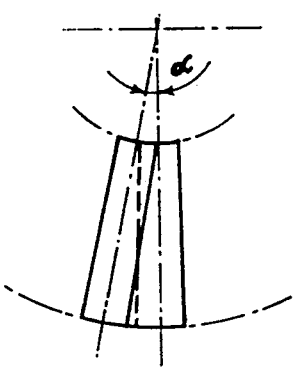
Figure 12:
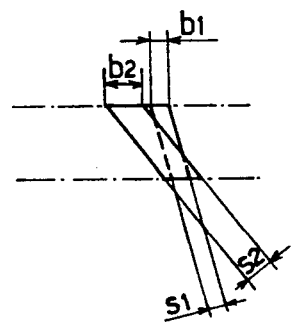
FIGS. 12 and 13 are a side and plan views, respectively, of a third type of impeller blade obtained through the process according to the invention.
Figure 13:
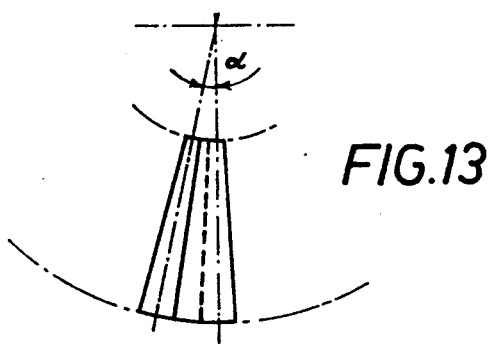

By properly adjusting the operating condition it is further possible to obtain blades in which:

1) the thickness varies from $s_1$ to $s_2$ passing from inside to the periphery of the blade, where $s_1 > s_2$, the horizontal cross section of the blade remaining constant, therefore $b_1 = b_2$ as shown in FIGS. 8 and 9;

2) the thickness is constant, that is $s_1 = s_2$, but the horizontal cross section is increasing, therefore $b_1 < b_2$ as shown in FIGS. 10 and 11;

3) both the thickness s and the horizontal cross section vary linearly with the blade radius, therefore $s_1 < s_2$ and $b_1 < b_2$, as shown in FIGS. 12 and 13.

Additional embodiments that have not been illustrated allows for obtaining outward tapered blades that are strong at the root and lightened at the periphery.

Embodiments of the invention that are presently preferred have been disclosed, but of course the invention is subjected to several modifications and changes within the attached claims.

We claim:

1. A rotor for a turbine pump manufactured by preparing a workpiece having at least one disk, placing said workpiece within an apparatus for electrical discharge machining in such a manner as to act as an electrode thereof, passing said at least one disk through a tool acting as the other electrode with a combined motion of rotation and translation, said tool comprising at least one plate in which radial slits are formed along and equally spaced in an arc of a semicircumference, said slits opening into a hollow area defined as a semicircular recess formed on a side of said plate, so that an impeller blade is produced for each of said slits in said tool as a result of said combined motion of rotation and translation of said at least one disk through said tool.

2. A rotor for a turbine pump as claimed in claim 1, wherein said impeller blades comprise an array of twisted blades.

3. A process for manufacturing an impeller having one or more blades for a turbine pump, comprising the steps of preparing a workpiece having at least one disk corresponding to the impeller to be realized, placing said workpiece within an apparatus for electrical discharge machining in such a manner as to act as an electrode thereof, passing said at least one disk through a tool acting as the other electrode with a combined motion of rotation and translation, said tool comprising at least one plate in which radial slits are formed along and equally spaced in an arc of a semicircumference, said slits opening into hollow area defined by a semicircular recess formed on a side of said plate, so that an impeller blade is produced for each of said slits in said tool as a result of said combined motion of rotation and translation of said at least one disk through said tool.

4. A process as claimed in claim 3, wherein the radius of said disk is smaller than or equal to the sum of the radius of said hollow area and the length of said slits.

5. A process as claimed in claim 3, wherein said tool comprises a plate in which said slits are equally spaced along a semicircular crown and said hollow area is a semicircular recess.

6. A process as claimed in claim 3, wherein said workpiece to be electrical discharge machined is a semifinished integral piece.

7. A process for manufacturing an impeller having one or more blades for a turbine pump, comprising the steps of preparing a workpiece having at least one disk corresponding to the impeller to be realized, said workpiece comprising a shaft carrying a plurality of fixed disks placing said workpiece within an apparatus for electrical discharge machining in such a manner as to act as an electrode thereof, passing said at least one disk through a tool acting as the other electrode with an combined motion of rotation and translation, said tool comprising a plurality of plates in which radial slits are formed along an arc of circumference, said slits opening into a hollow area defined within said plate, so that an impeller blade is produced for each of said slits in said tool as a result of each of said disks being introduced between adjacent ones of said plates, said disks being brought against said plates with a combined motion of rotation and translation of said at least one disk through said tool in order to obtain a first half of said impeller blades, and then said workpiece is rotated in such a way as to expose the unmachined portion of said disks to the tool, and is again moved through said plates with a combined motion of rotation and translation along the same direction, but backwards.

8. A process as claimed in claim 7, wherein said slits are equally spaced along a semicircumference, and said hollow area is a semicircular recess formed on a side of the plates.

* * * * *